US010526244B2

(12) United States Patent
Weidner et al.

(10) Patent No.: US 10,526,244 B2
(45) Date of Patent: Jan. 7, 2020

(54) INSULATED GLAZING UNIT

(71) Applicant: PILKINGTON GROUP LIMITED, Lathom (GB)

(72) Inventors: Stephen Emil Weidner, Maumee, OH (US); Neil McSporran, Perrysburg, OH (US)

(73) Assignee: Pilkington Group Limited, Lathom (GB)

( * ) Notice: Subject to any disclaimer, the term of this patent is extended or adjusted under 35 U.S.C. 154(b) by 161 days.

(21) Appl. No.: 15/519,870

(22) PCT Filed: Oct. 9, 2015

(86) PCT No.: PCT/GB2015/052960
§ 371 (c)(1),
(2) Date: Apr. 18, 2017

(87) PCT Pub. No.: WO2016/063007
PCT Pub. Date: Apr. 28, 2016

(65) Prior Publication Data
US 2017/0253524 A1    Sep. 7, 2017

Related U.S. Application Data

(60) Provisional application No. 62/065,883, filed on Oct. 20, 2014.

(51) Int. Cl.
*E06B 3/66* (2006.01)
*C03C 17/36* (2006.01)
(Continued)

(52) U.S. Cl.
CPC ...... *C03C 17/3642* (2013.01); *C03C 17/2453* (2013.01); *C03C 17/366* (2013.01);
(Continued)

(58) Field of Classification Search
CPC ....... Y02B 80/24; E06B 3/663; E06B 3/6612; E06B 3/6715; E06B 3/66366;
(Continued)

(56) References Cited

U.S. PATENT DOCUMENTS 5,344,718 A    9/1994 Hartig et al.
5,425,861 A    6/1995 Hartig et al.
(Continued)

FOREIGN PATENT DOCUMENTS

CN    101124085 A    2/2008
EP    0999330 A1    5/2000
(Continued)

OTHER PUBLICATIONS

European Patent Office, International Search Report and Written Opinion, issued in PCT/GB2015/052960, dated Dec. 18, 2015, 8 pages, European Patent Office, Rijswijk, Netherlands.

*Primary Examiner* — Donald J Loney
(74) *Attorney, Agent, or Firm* — Marshall & Melhorn, LLC

(57) ABSTRACT

Insulated glazing units comprising first and second sheets of glazing material with a low pressure space there between are described. The major surface of the second sheet of glazing material not facing the low pressure space has a low emissivity coating comprising at least one layer of fluorine doped tin oxide thereon. There is a first anti-iridescence coating between the low emissivity coating and the second sheet of glazing material. Also described are insulated glazing units comprising three (first, second and third) sheets of glazing material with a low pressure space between first and second sheets of glazing material, and a second space between the first and third sheets of glazing material. There is a low emissivity coating on one or both major surfaces facing the low pressure space. The third sheet of glazing material has
(Continued)

a low emissivity coating on both opposed major surfaces thereof.

20 Claims, 5 Drawing Sheets

(51) Int. Cl.
  *E06B 3/67* (2006.01)
  *C03C 17/245* (2006.01)
  *E06B 9/24* (2006.01)
  *E06B 3/663* (2006.01)

(52) U.S. Cl.
  CPC ...... *C03C 17/3644* (2013.01); *C03C 17/3681* (2013.01); *E06B 3/6612* (2013.01); *E06B 3/6715* (2013.01); *E06B 9/24* (2013.01); *C03C 2217/211* (2013.01); *C03C 2217/241* (2013.01); *C03C 2218/154* (2013.01); *E06B 3/663* (2013.01); *E06B 3/66366* (2013.01); *E06B 2009/2417* (2013.01)

(58) Field of Classification Search
  CPC ......... E06B 2009/2417; C03C 17/3642; C03C 17/3644; C03C 17/2453; C03C 17/3681; C03C 17/366; C03C 2217/241; C03C 2217/211; C03C 2218/154
  See application file for complete search history.

(56) References Cited

U.S. PATENT DOCUMENTS

| | | |
|---|---|---|
| 5,557,462 A | 9/1996 | Hartig et al. |
| 5,656,177 A | 8/1997 | Werres |
| 5,698,262 A | 12/1997 | Soubeyrand et al. |
| 6,105,336 A | 8/2000 | Katoh et al. |
| 6,479,112 B1 | 11/2002 | Shukuri et al. |
| 6,830,791 B1 | 12/2004 | Misonou et al. |
| 6,955,026 B2 * | 10/2005 | Misonou ............... E06B 3/66 52/786.13 |
| 8,377,524 B2 | 2/2013 | Theios et al. |
| 8,900,679 B2 | 12/2014 | Theios et al. |
| 2011/0256325 A1 | 10/2011 | Sanderson et al. |
| 2013/0089684 A1 * | 4/2013 | Pesce ............... C03C 17/245 428/34 |

FOREIGN PATENT DOCUMENTS

| | | |
|---|---|---|
| EP | 1030023 A1 | 8/2000 |
| EP | 0860406 B1 | 12/2001 |
| EP | 1630344 A1 | 3/2006 |
| JP | 2014097901 A | 5/2014 |
| WO | 95/15296 A1 | 6/1995 |
| WO | 97/42357 A1 | 11/1997 |
| WO | 00/37376 A1 | 6/2000 |
| WO | 2006091668 A1 | 8/2006 |
| WO | 2009/106864 A1 | 9/2009 |

* cited by examiner

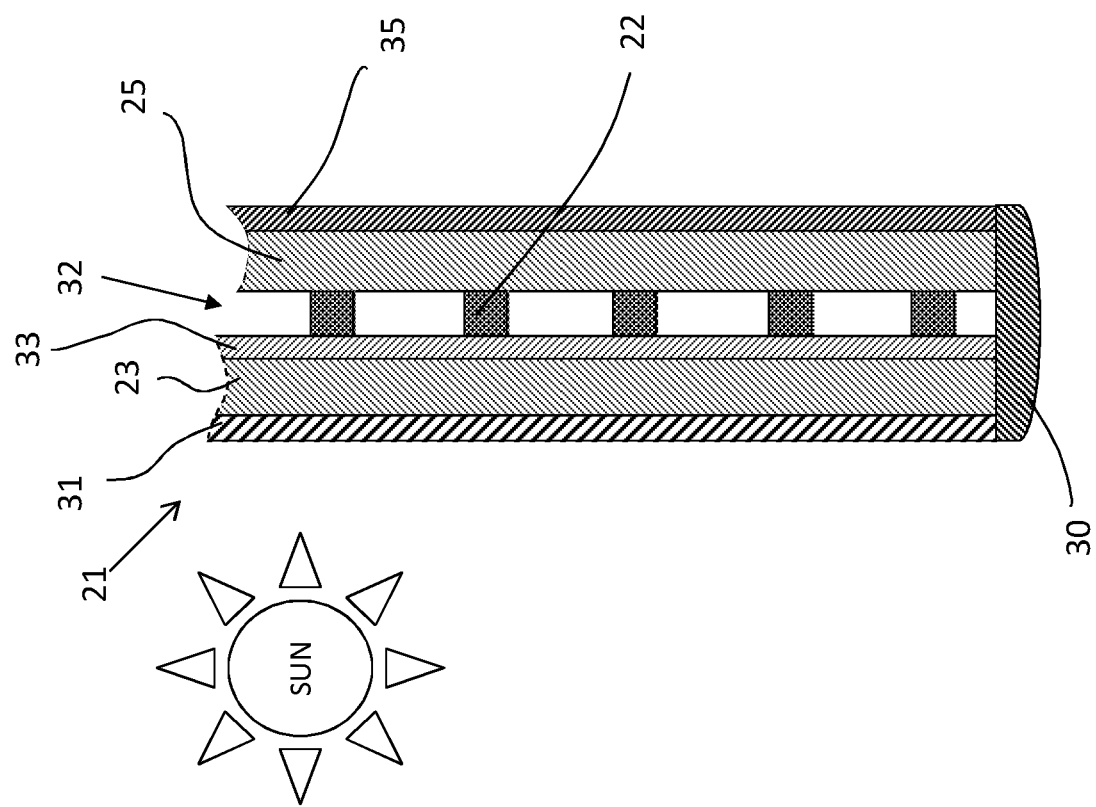
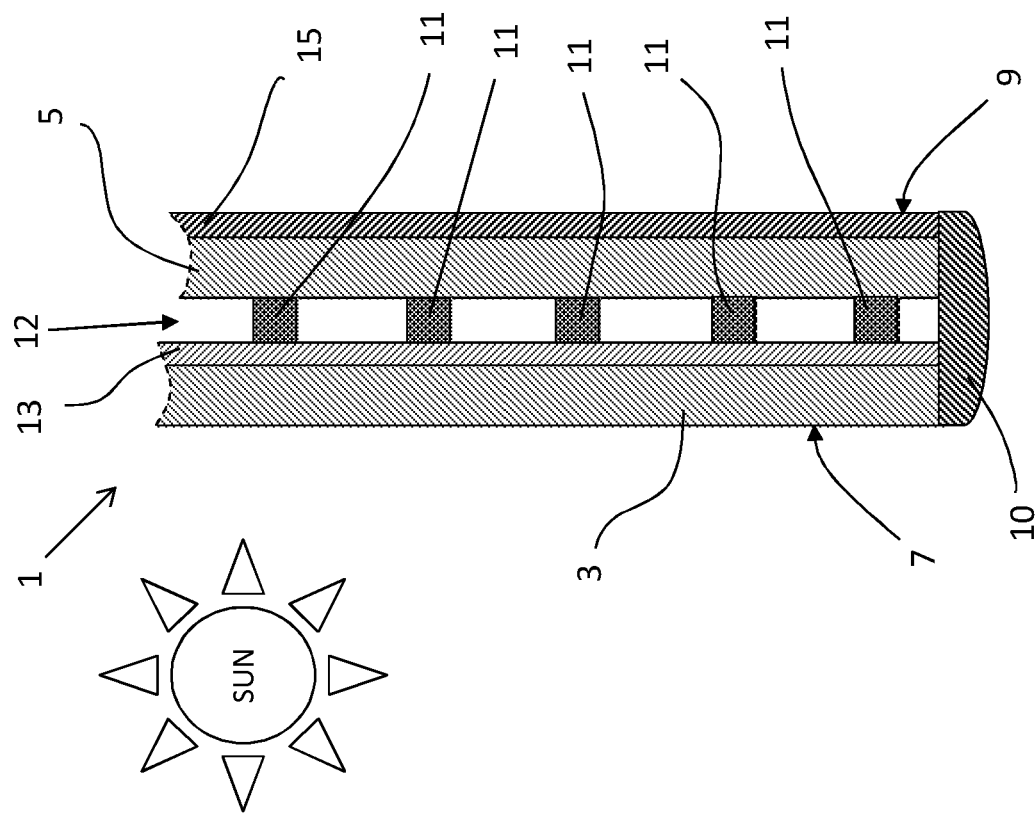

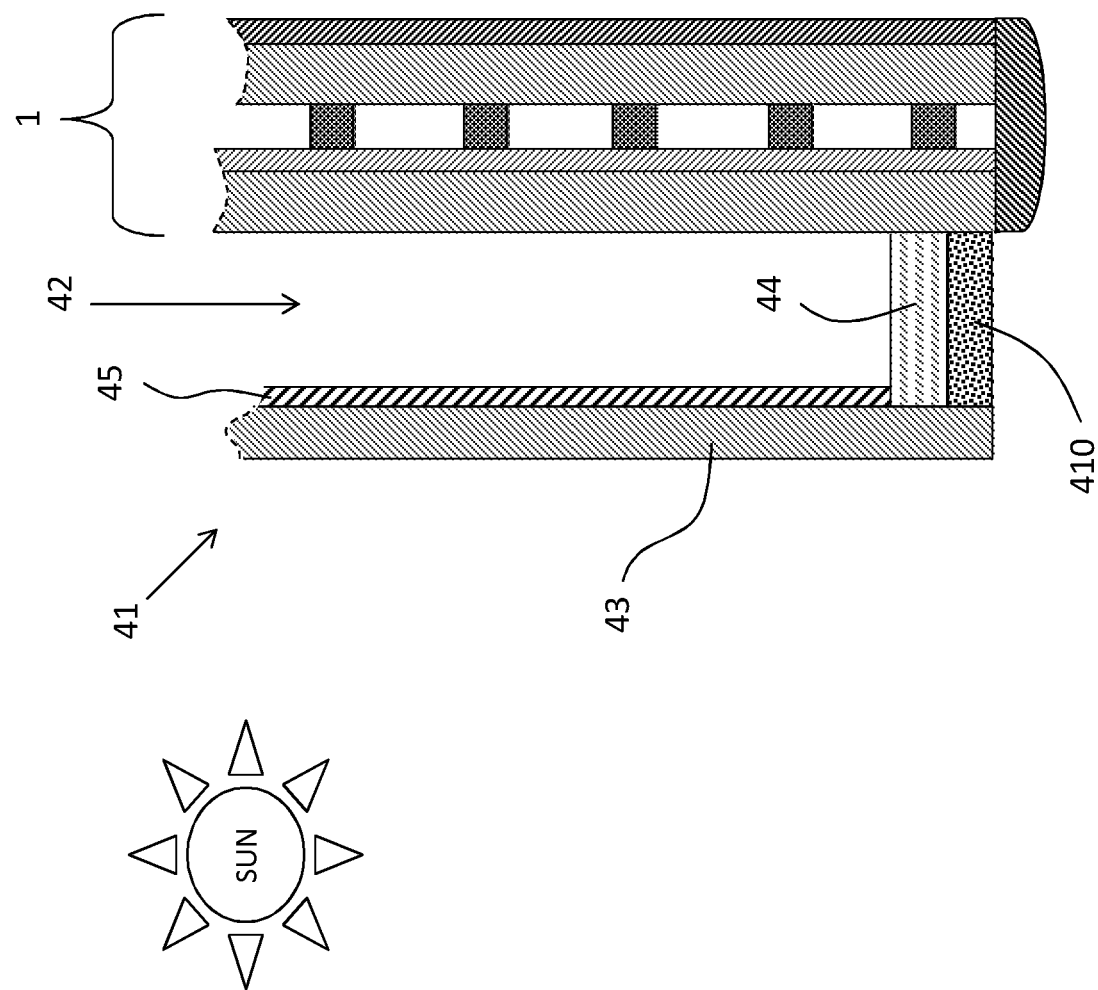

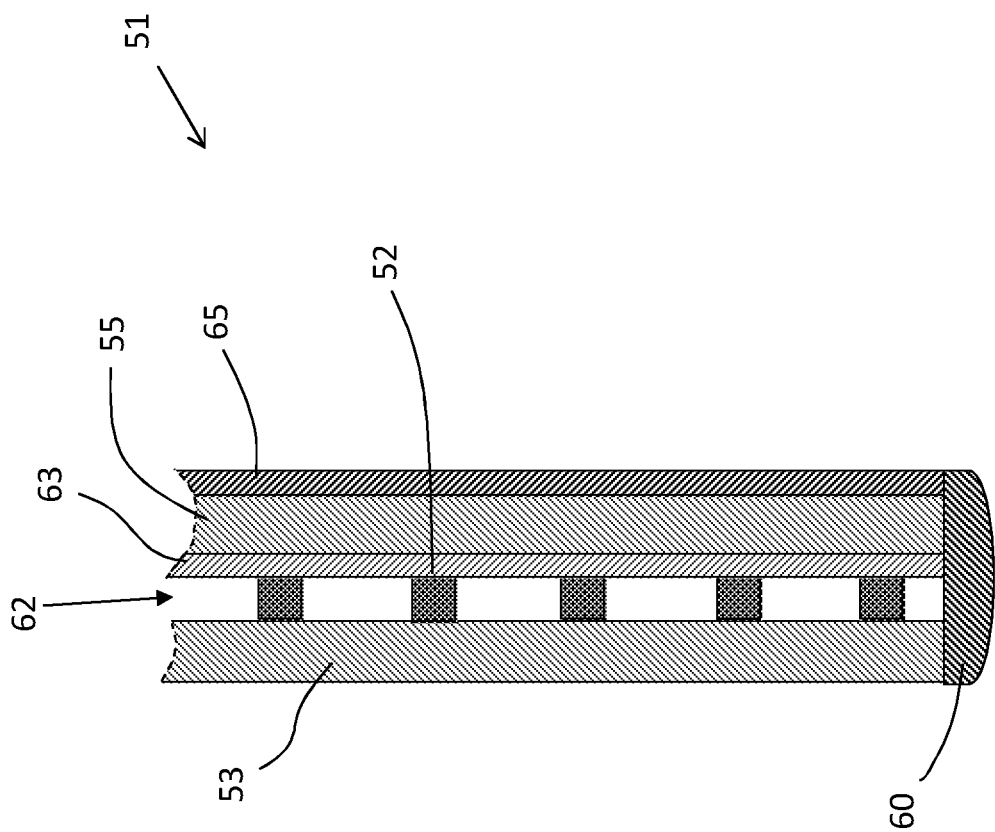
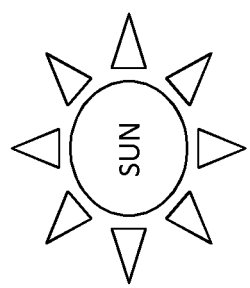
Fig. 4

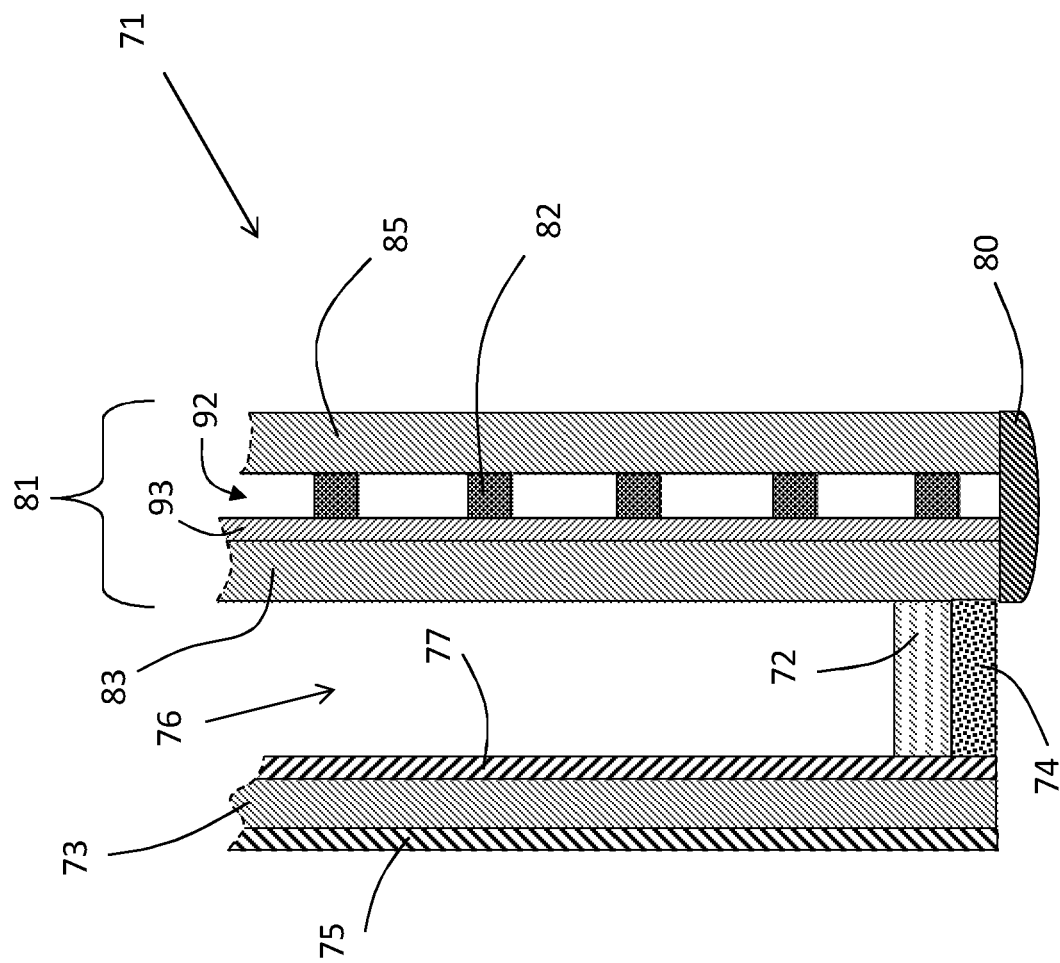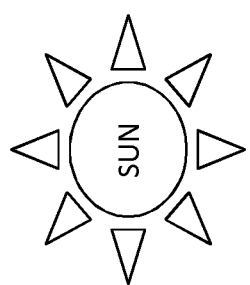
Fig. 5

INSULATED GLAZING UNIT

BACKGROUND OF THE INVENTION

The present invention relates to an insulated glazing unit having improved thermal insulation properties.

Insulated glazing units are known comprising at least two spaced apart sheets of glass. One such type of insulated glazing unit comprises two sheets of glass spaced apart by perimeter seals and are conventionally known as double glazed units.

Another type of insulated glazing unit comprises two sheets of glass spaced apart by an evacuated space. Disposed in the evacuated space is a plurality of spacers to maintain a spacing of around 1.2 mm between the two sheets of glass. The periphery of the two glass sheets may be sealed with a solder glass, for example as described in EP0860406B1 or an organic material as described in EP1630344A1. This type of insulated glazing unit is often referred to as a vacuum insulated glazing unit, or VIG. VIG's are also described in WO95/15296A1 and EP0999330A1.

It is also known that a VIG may be one pane of a double glazed unit, for example as described in EP0860406B1, EP1030023A1 and U.S. Pat. No. 8,377,524B2. The VIG is spaced apart from another pane, such as a glass sheet. This type of insulated glazing unit has an evacuated low pressure space and an air space (typically filled with an inert gas such as argon or krypton).

It is known that the external surfaces of insulated glazing units such as double glazing units may become fogged due to condensation forming on the outer surfaces. This is a consequence of the emission of heat from the outer glazing. For the surface of a double glazing unit facing the outside i.e. the outer surface, if insufficient heat flows from the internal space to the outer surface, as is the case with insulated glazing units with low U values, the temperature of the outside surface drops. When there is a sufficiently high relative external atmospheric humidity this leads to fogging i.e. condensation or frost deposition, as a result of the temperature of the outer surface falling below the dew point.

SUMMARY OF THE INVENTION

The present invention provides an insulated glazing unit having improved thermal performance.

Accordingly from a first aspect the present invention provides an insulated glazing unit comprising a first sheet of glazing material and a second sheet of glazing material, there being a first space between the first sheet of glazing material and the second sheet of glazing material, wherein the first sheet of glazing material has a first major surface and an opposing second major surface, and the second sheet of glazing material has a first major surface and an opposing second major surface, wherein the second major surface of the first sheet of glazing material and the first major surface of the second sheet of glazing material face the first space, wherein the first space is a low pressure space having a pressure less than atmospheric pressure, there being a plurality of spacers disposed in the first space, characterised in that the second major surface of the second sheet of glazing material has a low emissivity coating thereon, the low emissivity coating comprising at least one layer of fluorine doped tin oxide and there is a first anti-iridescence coating in between the low emissivity coating and the second sheet of glazing material.

The provision of the low emissivity coating on the second major surface of the second sheet of glazing material reduces the U-value of the insulated glazing unit compared to the same insulated glazing unit without the low emissivity coating on the second major surface of the second sheet of glazing material.

Such an insulated glazing unit may be installed in a building. When installed in a building, it is preferred that the first major surface of the first sheet of glazing material faces the exterior of the building, and the second major surface of the second sheet of glazing material faces the interior of the building. Alternatively, the insulated glazing unit may be installed in a building such that the first major surface of the first sheet of glazing material faces the interior of the building, and the second major surface of the second sheet of glazing material faces the exterior of the building. When the insulated glazing unit is configured such that the second major surface of the second sheet of glazing material faces the exterior of a building in which the insulated glazing unit is installed, the provision of a low emissivity coating on the second major surface of the second sheet of glazing material helps reduce the formation of condensation on the second major surface of the second sheet of glazing material because the temperature of the second sheet of glazing material may be raised.

Suitably the first sheet of glazing material is spaced apart from the second sheet of glazing material by less than 1 mm, preferably by 0.05 mm to 0.5 mm, more preferably by 0.1 mm to 0.3 mm.

Suitably an hermetic seal extending around the periphery of each the first and second sheets of glazing material joins the first sheet of glazing material to the second sheet of glazing material. The hermetic seal ensures the first space is maintained at suitably low pressure. The spacers disposed in the first space prevents the second major surface of the first sheet of glazing material coming into contact with the first major surface of the second sheet of glazing material.

It is to be understood within the context of the present invention that when a coating has a layer A on a layer B, this does not rule out the possibility of there being one or more other layers i.e. layers C, D, E etc in between layer A and layer B. Similarly, when a surface of a sheet of glazing material has a layer A' thereon, this does not rule out the possibility of there being one or more other layers i.e. layers B, C, D, E etc in between layer A and the surface of the sheet of glazing material.

For clarity, the first major surface of the first sheet of glazing material is also referred to as surface i of the insulated glazing unit. For clarity, the second major surface of the first sheet of glazing material is also referred to as surface ii of the insulated glazing unit. For clarity, the first major surface of the second sheet of glazing material is also referred to as surface iii of the insulated glazing unit. For clarity, the second major surface of the first sheet of glazing material is also referred to as surface iv of the insulated glazing unit.

Using this notation for referring to the major surfaces of the sheets of glazing material, and for the avoidance of doubt, an insulated glazing unit according to the first aspect of the present invention has a low emissivity coating on surface iv.

Again for the avoidance of doubt, depending upon the orientation of the insulated glazing unit when installed in a building or the like, surface i may face either the interior of the building or the exterior of the building.

As is conventional in the art, the surface of an insulated glazing unit configured to directly face the external environment of a structure in which the insulated glazing unit is installed is referred to as surface 1. The surface opposite surface 1 is referred to as surface 2 i.e. surface 1 is one major surface of a glazing pane and surface 2 is the opposing major surface of the glazing pane. The surface of the insulating glazing unit opposite surface 2 is referred to as surface 3. The surface opposite surface 3 is referred to as surface 4, and so on for additional glazing panes. For example, for an insulated glazing unit having two spaced apart glazing panes i.e. glass, surface 1 of the insulated glazing unit faces the exterior of the structure in which the insulated glazing unit is installed and surface 4 faces the interior of the structure in which the insulated glazing unit is installed. In relation to the naming convention adopted in the present application, surface i or surface iv of the insulated glazing unit of the first aspect of the present invention may be surface 1.

Preferably the geometric thickness of the at least one fluorine doped tin oxide layer of the low emissivity coating on surface iv is between 100 nm and 600 nm.

In some embodiments preferably the geometric thickness of the at least one fluorine doped tin oxide layer of the low emissivity coating on surface iv is between 100 nm and 300 nm, more preferably between 100 nm and 290 nm, even more preferably between 100 nm and 250 nm.

By having a thin layer of fluorine doped tin oxide the low emissivity coating is less susceptible to surface damage because the coating is less rough. In addition costs are reduced because less coating is required to achieve the anti-condensation properties. Furthermore the G value of the insulated glazing unit is higher compared to the same insulated glazing unit with a thicker layer of fluorine doped tin oxide.

In some embodiments preferably the geometric thickness of the at least one layer of fluorine doped tin oxide of the low emissivity coating on surface iv is between 300 nm and 400 nm, more preferably between 300 nm and 350 nm.

In some embodiments preferably the geometric thickness of the at least one fluorine doped tin oxide layer of the low emissivity coating on surface iv is between 400 nm and 600 nm, more preferably between 500 nm and 580 nm.

Preferably the first anti-iridescence layer comprises a first layer and a second layer, wherein the first layer of the first anti-iridescence layer has a higher refractive index than the second layer of the first anti-iridescence layer and the second layer of the first anti-iridescence layer is in between the first layer of the first anti-iridescence layer and the first low emissivity coating.

Preferably the first layer of the first anti-iridescence layer comprises tin oxide.

Preferably the second layer of the first anti-iridescence layer comprises silica.

Preferably the first layer of the first anti-iridescence layer has a geometric thickness of between 10 nm and 50 nm, preferably between 15 nm and 35 nm.

Preferably the second layer of the first anti-iridescence layer has a geometric thickness of between 10 nm and 50 nm, preferably between 15 nm and 35 nm.

Preferably there is a first haze reducing layer in between the second sheet of glazing material and the first anti-iridescence layer.

Preferably the first haze reducing layer comprises silica.

Preferably the geometric thickness of the first haze reducing layer is between 5 nm and 50 nm, more preferably between 5 nm and 25 nm.

In some embodiments there is a low emissivity coating on surface iii.

Preferably there is an anti-iridescence coating in between the low emissivity coating on surface iii and the second sheet of glazing material.

The anti-iridescence coating in between the low emissivity coating on surface iii and the second sheet of glazing material has the same preferable features as described above in relation to the first anti-iridescence coating.

Preferably the low emissivity coating on surface iii comprises at least one silver layer and/or at least one fluorine doped tin oxide layer.

When the low emissivity coating on surface iii comprises at least one silver layer, preferably the geometric thickness of the at least one silver layer is between 5 nm and 20 nm.

When the low emissivity coating on surface iii comprises at least one fluorine doped tin oxide layer preferably the geometric thickness of the at least one fluorine doped tin oxide layer of the low emissivity coating on surface iii is between 100 nm and 600 nm.

In some embodiments preferably the geometric thickness of the at least one fluorine doped tin oxide layer of the low emissivity coating on surface iii is between 100 nm and 300 nm, more preferably between 100 nm and 290 nm, even more preferably between 100 nm and 250 nm.

In some embodiments preferably the geometric thickness of the at least one fluorine doped tin oxide layer of the low emissivity coating on surface iii is between 250 nm and 350 nm.

In some embodiments preferably the geometric thickness of the at least one layer of fluorine doped tin oxide of the low emissivity coating on surface iii is between 300 nm and 400 nm, more preferably between 300 nm and 350 nm.

In some embodiments preferably the geometric thickness of the at least one fluorine doped tin oxide layer of the low emissivity coating on surface iii is between 400 nm and 600 nm, more preferably between 500 nm and 580 nm.

When the low emissivity coating on surface iii comprises at least one fluorine doped tin oxide layer, preferably there is an anti-iridescence layer of SiCOx between the low emissivity coating on surface 3 and the second sheet of glazing material. Preferably the SiCOx layer has a geometric thickness between 50 nm and 100 nm.

In some embodiments there is a low emissivity coating on surface ii.

Preferably there is an anti-iridescence coating in between the low emissivity coating on surface ii and the first sheet of glazing material.

The anti-iridescence coating in between the low emissivity coating on surface ii and the first sheet of glazing material has the same preferable features as described above in relation to the first anti-iridescence coating.

Preferably the low emissivity coating on surface ii comprises at least one silver layer and/or at least one fluorine doped tin oxide layer.

When the low emissivity coating on surface ii comprises at least one silver layer, preferably the geometric thickness of the at least one silver layer is between 5 nm and 20 nm.

When the low emissivity coating on surface ii comprises at least one fluorine doped tin oxide layer preferably the geometric thickness of the at least one fluorine doped tin oxide layer of the low emissivity coating on surface ii is between 100 nm and 600 nm. In some embodiments preferably the geometric thickness of the at least one fluorine doped tin oxide layer of the low emissivity coating on surface ii is between 100 nm and 300 nm, more preferably between 100 nm and 290 nm, even more preferably between 100 nm and 250 nm.

In some embodiments preferably the geometric thickness of the at least one fluorine doped tin oxide layer of the low emissivity coating on surface ii is between 250 nm and 350 nm.

In some embodiments preferably the geometric thickness of the at least one layer of fluorine doped tin oxide of the low emissivity coating on surface ii is between 300 nm and 400 nm, more preferably between 300 nm and 350 nm.

In some embodiments preferably the geometric thickness of the at least one fluorine doped tin oxide layer of the low emissivity coating on surface ii is between 400 nm and 600 nm, more preferably between 500 nm and 580 nm.

When the low emissivity coating on surface ii comprises at least one fluorine doped tin oxide layer, preferably there is an anti-iridescence layer of SiCOx between the low emissivity coating on surface ii and the first sheet of glazing material. Preferably the SiCOx layer has a geometric thickness between 50 nm and 100 nm.

In some embodiments there is a low emissivity coating on surface i.

When the insulated glazing unit is configured such that the first major surface of the first sheet of glazing material (i.e. surface i) faces the exterior of a building in which the insulated glazing unit is installed, the provision of a low emissivity coating on the first major surface of the first sheet of glazing material helps reduce the formation of condensation on the first major surface because the temperature of the first sheet of glazing material may be raised.

Preferably there is an anti-iridescence coating in between the low emissivity coating on surface i and the first sheet of glazing material.

The anti-iridescence coating in between the low emissivity coating on surface i and the first sheet of glazing material has the same preferable features as described above in relation to the first anti-iridescence coating.

In some embodiments there is a low emissivity coating on surface i comprising at least one layer of fluorine doped tin oxide.

Preferably the geometric thickness of the at least one fluorine doped tin oxide layer of the low emissivity coating on surface i is between 100 nm and 600 nm.

Preferably the geometric thickness of the at least one fluorine doped tin oxide layer of the low emissivity coating on surface i is between 100 nm and 300 nm, more preferably between 100 nm and 290 nm, even more preferably between 100 nm and 250 nm.

By having a thin layer of fluorine doped tin oxide the low emissivity coating is less susceptible to surface damage because the coating is less rough. In addition costs are reduced because less coating is required to achieve the anti-condensation properties. Furthermore the G value of the insulated glazing unit is higher compared to the same insulated glazing unit with a thicker layer of fluorine doped tin oxide.

In some embodiments preferably the geometric thickness of the at least one fluorine doped tin oxide layer of the low emissivity coating on surface i is between 300 nm and 400 nm, more preferably between 300 nm and 350 nm.

In some embodiments preferably the geometric thickness of the at least one fluorine doped tin oxide layer of the low emissivity coating on surface i is between 400 nm and 600 nm, more preferably between 500 nm and 580 nm.

Insulated glazing units according to the first aspect of the present invention have other preferable features.

In some embodiments there are no other layers on the low emissivity coating on surface iv.

In some embodiments, there is a layer of silica on the low emissivity coating on surface iv. Preferably the layer of silica on the low emissivity coating on surface iv has a geometric thickness of between 5 nm and 50 nm.

In some embodiments, there is a layer of titania on the low emissivity coating on surface iv. Preferably the layer of titania on the low emissivity coating on surface iv has a geometric thickness of between 5 nm and 50 nm.

In embodiments where there is a low emissivity coating on surface i, preferably there is a layer of silica on the low emissivity coating on surface i. Preferably the layer of silica on the low emissivity coating on surface i has a geometric thickness of between 5 nm and 50 nm.

In embodiments where there is a low emissivity coating on surface i, preferably there is a layer of titania on the low emissivity coating on surface i. Preferably the layer of titania on the low emissivity coating on surface i has a geometric thickness of between 5 nm and 50 nm.

In embodiments where there is a low emissivity coating on surface i, preferably there is no other layer on the low emissivity coating on surface i.

In some embodiments, there is an antireflection coating on the low emissivity coating on surface iv.

Preferably the antireflection coating on the low emissivity coating on surface iv comprises at least four layers.

Preferably the antireflection coating on the low emissivity coating on surface iv comprises in sequence, a first layer of tin oxide, a second layer of silica, a third layer of fluorine doped tin oxide and a fourth layer of silica, wherein the first layer of tin oxide is between the second layer of silica and the low emissivity coating on surface iv.

Preferably the first layer of tin oxide of the antireflection coating on the low emissivity coating on surface iv has a geometric thickness between 10 nm and 15 nm.

Preferably the second layer of silica of the antireflection coating on the low emissivity coating on surface iv has a geometric thickness between 20 nm and 30 nm.

Preferably the third layer of fluorine doped tin oxide of the antireflection coating on the low emissivity coating on surface iv has a geometric thickness between 100 nm and 150 nm.

Preferably the fourth layer of silica of the antireflection coating on the low emissivity coating on surface iv has a geometric thickness between 80 nm and 100 nm.

In embodiments where there is a low emissivity coating on surface i, preferably there is an antireflection coating on the low emissivity coating on surface i.

Preferably the antireflection coating on the low emissivity coating on surface i comprises at least four layers.

Preferably the antireflection coating on the low emissivity coating on surface i comprises in sequence, a first layer of tin oxide, a second layer of silica, a third layer of fluorine doped tin oxide and a fourth layer of silica, wherein the first layer of tin oxide is between the second layer of silica and the low emissivity coating on surface 1.

Preferably the first layer of tin oxide of the antireflection coating on the low emissivity coating on surface i has a geometric thickness between 8 nm and 15 nm, more preferably between 11 nm and 13 nm.

Preferably the second layer of silica of the antireflection coating on the low emissivity coating on surface i has a geometric thickness between 20 nm and 30 nm, more preferably between 22 nm and 27 nm.

Preferably the third layer of fluorine doped tin oxide of the antireflection coating on the low emissivity coating on surface i has a geometric thickness between 100 nm and 150 nm, more preferably between 120 nm and 140 nm.

Preferably the fourth layer of silica of the antireflection coating on the low emissivity coating on surface i has a geometric thickness between 70 nm and 120 nm, more preferably between 80 nm and 100 nm.

In some embodiments the roughness of the low emissivity coating on surface iv is less than 20 nm, more preferably between 3 nm and 15 nm, even more preferably between 5 nm and 12 nm.

In embodiments where the is a low emissivity coating on surface i, preferably the roughness of the low emissivity coating on surface i is less than 20 nm, more preferably between 3 nm and 15 nm, even more preferably between 5 nm and 12 nm.

In some embodiments of the first aspect of the present invention the insulated glazing unit comprises a third sheet of glazing material facing the first sheet of the glazing material and being separated therefrom by a second space, the third sheet of glazing material having a first major surface and a second major surface, wherein the insulated glazing unit is configured such that the second major surface of the third sheet of glazing material and the first major surface of the first sheet of glazing material (i.e. surface i) face the second space.

Preferably the second space is an air space.

Preferably the second space is filled with an inert gas such as argon or krypton.

Preferably the third sheet of glazing material is spaced from the first sheet of glazing material by more than 2 mm, preferably by 5 mm to 50 mm, more preferably by 5 mm to 25 mm.

Preferably the first major surface of the third sheet of glazing material has a low emissivity coating thereon.

Preferably the second major surface of the third sheet of glazing material has a low emissivity coating thereon. Preferably the low emissivity coating on the second major surface of the third sheet of glazing material comprises at least one layer of silver and/or at least one layer of fluorine doped tin oxide.

Embodiments of the first aspect of the present invention having a third sheet of glazing material having a low emissivity coating on the first major surface of the third sheet of glazing material have other preferable features.

Preferably there is an anti-iridescence coating in between the low emissivity coating on the first major surface of the third sheet of glazing material and the third sheet of glazing material.

Preferably the anti-iridescence layer comprises a first layer and a second layer, wherein the first layer of the anti-iridescence layer has a higher refractive index than the second layer of the anti-iridescence layer and the second layer of the anti-iridescence layer is in between the first layer of the anti-iridescence layer and the low emissivity coating on the first major surface of the third sheet of glazing material.

Preferably the first layer of the anti-iridescence layer comprises tin oxide.

Preferably the second layer of the anti-iridescence layer comprises silica.

Preferably the first layer of the anti-iridescence layer has a geometric thickness of between 10 nm and 50 nm, preferably between 15 nm and 35 nm.

Preferably the second layer of the anti-iridescence layer has a geometric thickness of between 10 nm and 50 nm, preferably between 15 nm and 35 nm.

Preferably there is a haze reducing layer in between the third sheet of glazing material and the anti-iridescence coating on the first major surface of the third sheet of glazing material.

Preferably the haze reducing layer comprises silica.

Preferably the thickness of the haze reducing layer is between 5 nm and 50 nm, more preferably between 5 nm and 25 nm.

When the first major surface of the third sheet of glazing material has a low emissivity coating thereon, preferably the low emissivity coating on the first major surface of the third sheet of glazing material comprises at least one layer of fluorine doped tin oxide.

Preferably the geometric thickness of the at least one fluorine doped tin oxide layer of the low emissivity coating on the first major surface of the third sheet of glazing material is between 100 nm and 600 nm.

Preferably the geometric thickness of the at least one layer of fluorine doped tin oxide of the low emissivity coating on the first major surface of the third sheet of glazing material is between 100 nm and 300 nm, more preferably between 100 nm and 290 nm, even more preferably between 100 nm and 250 nm.

By having a thin layer of fluorine doped tin oxide the low emissivity coating on the first major surface of the third sheet of glazing material is less susceptible to surface damage because the coating is less rough. In addition costs are reduced because less coating is required to achieve the anti-condensation properties. Furthermore the G value of the insulated glazing unit is higher compared to the same insulated glazing unit with a thicker layer of fluorine doped tin oxide.

Preferably the geometric thickness of the at least one fluorine doped tin oxide layer of the low emissivity coating on the first major surface of the third sheet of glazing material is between 300 nm and 400 nm, more preferably between 300 nm and 350 nm.

Preferably the geometric thickness of the at least one fluorine doped tin oxide layer of the low emissivity coating on the first major surface of the third sheet of glazing material is between 400 nm and 600 nm, more preferably between 500 nm and 580 nm.

Preferably there are no other layers on the low emissivity coating on the first major surface of the third sheet of glazing material.

Preferably there is a layer of silica on the low emissivity coating on the first major surface of the third sheet of glazing material. Preferably the layer of silica on the low emissivity coating on the first major surface of the third sheet of glazing material has a geometric thickness of between 5 nm and 50 nm.

Preferably there is a layer of titania on the low emissivity coating on the first major surface of the third sheet of glazing material. Preferably the layer of titania on the low emissivity coating on the first major surface of the third sheet of glazing material has a geometric thickness of between 5 nm and 50 nm.

Preferably there is an antireflection coating on the low emissivity coating on the first major surface of the third sheet of glazing material.

Preferably the antireflection coating on the low emissivity coating on the first major surface of the third sheet of glazing material comprises at least four layers.

Preferably the antireflection coating on the low emissivity coating on the first major surface of the third sheet of glazing material comprises in sequence, a first layer of tin oxide, a second layer of silica, a third layer of fluorine doped tin oxide and a fourth layer of silica, wherein the first layer of tin oxide is between the second layer of silica and the low emissivity coating on the first major surface if the third sheet of glazing material.

Preferably the first layer of tin oxide of the antireflection coating on the low emissivity coating on the first major surface of the third sheet of glazing material has a geometric thickness between 10 nm and 15 nm.

Preferably the second layer of silica of the antireflection coating on the low emissivity coating on the first major surface of the third sheet of glazing material has a geometric thickness between 20 nm and 30 nm.

Preferably the third layer of fluorine doped tin oxide of the antireflection coating on the low emissivity coating on the first major surface of the third sheet of glazing material has a geometric thickness between 100 nm and 150 nm.

Preferably the fourth layer of silica of the antireflection coating on the low emissivity coating on the first major surface of the third sheet of glazing material has a geometric thickness between 80 nm and 100 nm.

Embodiments of the first aspect of the present invention having a third sheet of glazing material having a low emissivity coating on the second major surface thereof have other preferable features.

Preferably there is an anti-iridescence coating in between the low emissivity coating on the second major surface of the third sheet of glazing material and the third sheet of glazing material.

Preferably the anti-iridescence layer comprises a first layer and a second layer, wherein the first layer of the anti-iridescence layer has a higher refractive index than the second layer of the anti-iridescence layer and the second layer of the anti-iridescence layer is in between the first layer of the anti-iridescence layer and the low emissivity coating on the second major surface of the third sheet of glazing material.

Preferably the first layer of the anti-iridescence layer comprises tin oxide.

Preferably the second layer of the anti-iridescence layer comprises silica.

Preferably the first layer of the anti-iridescence layer has a geometric thickness of between 10 nm and 50 nm, preferably between 15 nm and 35 nm.

Preferably the second layer of the anti-iridescence layer has a geometric thickness of between 10 nm and 50 nm, preferably between 15 nm and 35 nm.

Preferably there is a haze reducing layer in between the third sheet of glazing material and the anti-iridescence coating on the second major surface of the third sheet of glazing material.

Preferably the haze reducing layer comprises silica.

Preferably the thickness of the haze reducing layer is between 5 nm and 50 nm, more preferably between 5 nm and 25 nm.

In some embodiments the low emissivity coating on the second major surface of the third sheet of glazing material comprises at least one layer of fluorine doped tin oxide.

Preferably the geometric thickness of the at least one fluorine doped tin oxide layer of the low emissivity coating on the second major surface of the third sheet of glazing material is between 100 nm and 600 nm.

Preferably the geometric thickness of the at least one layer of fluorine doped tin oxide of the low emissivity coating on the second major surface of the third sheet of glazing material is between 100 nm and 300 nm, more preferably between 100 nm and 290 nm, even more preferably between 100 nm and 250 nm.

By having a thin layer of fluorine doped tin oxide the low emissivity coating on the second major surface of the third sheet of glazing material is less susceptible to surface damage (for example when being transported or during assembly of the insulated glazing) because the coating is less rough. In addition costs are reduced because less coating is required to achieve the anti-condensation properties. Furthermore the G value of the insulated glazing unit is higher compared to the same insulated glazing unit with a thicker layer of fluorine doped tin oxide.

Preferably the geometric thickness of the at least one fluorine doped tin oxide layer of the low emissivity coating on the second major surface of the third sheet of glazing material is between 300 nm and 400 nm, more preferably between 300 nm and 350 nm.

In some embodiments preferably the geometric thickness of the at least one fluorine doped tin oxide layer of the low emissivity coating on the second major surface of the third sheet of glazing material is between 400 nm and 600 nm, more preferably between 500 nm and 580 nm.

Preferably there are no other layers on the low emissivity coating on the second major surface of the third sheet of glazing material.

Preferably there is a layer of silica on the low emissivity coating on the second major surface of the third sheet of glazing material. Preferably the layer of silica on the low emissivity coating on the second major surface of the third sheet of glazing material has a geometric thickness of between 5 nm and 50 nm.

Preferably there is a layer of titania on the low emissivity coating on the second major surface of the third sheet of glazing material. Preferably the layer of titania on the low emissivity coating on the second major surface of the third sheet of glazing material has a geometric thickness of between 5 nm and 50 nm.

From a second aspect the present invention provides an insulated glazing unit comprising a first sheet of glazing material and a second sheet of glazing material, there being a first space between the first sheet of glazing material and the second sheet of glazing material, wherein the first sheet of glazing material has a first major surface and an opposing second major surface, and the second sheet of glazing material has a first major surface and an opposing second major surface, wherein the second major surface of the first sheet of glazing material and the first major surface of the second sheet of glazing material face the first space, wherein the first space is a low pressure space having a pressure less than atmospheric pressure, there being a plurality of spacers disposed in the first space, wherein the first major surface of the second sheet of glazing material and/or the second major surface of the first sheet of glazing material has a low emissivity coating thereon, the insulated glazing unit further comprising a third sheet of glazing material facing the first sheet of the glazing material and being separated therefrom by a second space, the third sheet of glazing material having a first major surface and a second major surface, wherein the second major surface of the third sheet of glazing material and the first major surface of the first sheet of glazing material face the second space, and wherein the second major surface of the third sheet of glazing material has a low emissivity coating thereon, characterised in that the first major surface of the third sheet of glazing material has a low emissivity coating thereon.

Suitably the first sheet of glazing material is spaced apart from the second sheet of glazing material by less than 1 mm, preferably by 0.05 mm to 0.5 mm, more preferably by 0.1 to 0.3 mm.

Preferably the second space is an air space.

Preferably the second space is filled with an inert gas such as argon or krypton.

Preferably the third sheet of glazing material is spaced from the first sheet of glazing material by more than 2 mm, preferably by 5 mm to 50 mm, more preferably by 5 mm to 25 mm.

Preferably there is a low emissivity coating on the second major surface of the first sheet of glazing material comprising at least one silver layer and/or at least on fluorine doped tin oxide layer.

Preferably there is a low emissivity coating on the first major surface of the second sheet of glazing material comprising at least one silver layer and/or at least on fluorine doped tin oxide layer.

Preferably there is an anti-iridescence coating in between the low emissivity coating on the first major surface of the third sheet of glazing material and the third sheet of glazing material.

Preferably the anti-iridescence layer comprises a first layer and a second layer, wherein the first layer of the anti-iridescence layer has a higher refractive index than the second layer of the anti-iridescence layer and the second layer of the anti-iridescence layer is in between the first layer of the anti-iridescence layer and the low emissivity coating on the first major surface of the third sheet of glazing material.

Preferably the first layer of the anti-iridescence layer comprises tin oxide.

Preferably the second layer of the anti-iridescence layer comprises silica.

Preferably the first layer of the anti-iridescence layer has a geometric thickness of between 10 nm and 50 nm, preferably between 15 nm and 35 nm.

Preferably the second layer of the anti-iridescence layer has a geometric thickness of between 10 nm and 50 nm, preferably between 15 nm and 35 nm.

Preferably there is a haze reducing layer in between the third sheet of glazing material and the anti-iridescence coating on the first major surface of the third sheet of glazing material.

Preferably the haze reducing layer comprises silica.

Preferably the thickness of the haze reducing layer is between 5 nm and 50 nm, more preferably between 5 nm and 25 nm.

In some embodiments of the second aspect of the present invention the low emissivity coating on the first major surface of the third sheet of glazing material comprises at least one layer of fluorine doped tin oxide.

Preferably the geometric thickness of the at least one layer of fluorine doped tin oxide of the low emissivity coating on the first major surface of the third sheet of glazing material is between 100 nm and 600 nm.

Preferably the geometric thickness of the at least one layer of fluorine doped tin oxide of the low emissivity coating on the first major surface of the third sheet of glazing material is between 100 nm and 300 nm, more preferably between 100 nm and 290 nm, even more preferably between 100 nm and 250 nm.

By having a thin layer of fluorine doped tin oxide the low emissivity coating is less susceptible to surface damage because the coating is less rough. In addition costs are reduced because less coating is required to achieve the anti-condensation properties. Furthermore the G value of the insulated glazing unit is higher compared to the same insulated glazing unit with a thicker layer of fluorine doped tin oxide.

In some embodiments of the geometric thickness of the at least one layer of fluorine doped tin oxide of the low emissivity coating on the first major surface of the third sheet of glazing material is between 250 nm and 350 nm.

In some embodiments the geometric thickness of the at least one layer of fluorine doped tin oxide of the low emissivity coating on the first major surface of the third sheet of glazing material is between 300 nm and 400 nm, more preferably between 300 nm and 350 nm.

In some embodiments the geometric thickness of the at least one layer of fluorine doped tin oxide of the low emissivity coating on the first major surface of the third sheet of glazing material is between 400 nm and 600 nm, preferably between 500 nm and 580 nm.

In some embodiments of the second aspect of the present invention there are no other layers on the low emissivity coating on the first major surface of the third sheet of glazing material.

In some embodiments of the second aspect of the present invention, there is a layer of silica on the low emissivity coating on the first major surface of the third sheet of glazing material. Preferably the layer of silica on the low emissivity coating on the first major surface of the third sheet of glazing material has a geometric thickness of between 5 nm and 50 nm.

In some embodiments of the second aspect of the present invention, there is a layer of titania on the low emissivity coating on the first major surface of the third sheet of glazing material. Preferably the layer of titania on the low emissivity coating on the first major surface of the third sheet of glazing material has a geometric thickness of between 5 nm and 50 nm.

In some embodiments of the second aspect of the present invention, there is an antireflection coating on the low emissivity coating on the first major surface of the third sheet of glazing material.

Preferably the antireflection coating on the low emissivity coating on the first major surface of the third sheet of glazing material comprises at least four layers.

Preferably the antireflection coating on the low emissivity coating on the first major surface of the third sheet of glazing material comprises in sequence, a first layer of tin oxide, a second layer of silica, a third layer of fluorine doped tin oxide and a fourth layer of silica, wherein the first layer of tin oxide is between the second layer of silica and the low emissivity coating on the first major surface if the third sheet of glazing material.

Preferably the first layer of tin oxide has a geometric thickness between 10 nm and 15 nm.

Preferably the second layer of silica has a geometric thickness between 20 nm and 30 nm.

Preferably the third layer of fluorine doped tin oxide has a geometric thickness between 100 nm and 150 nm.

Preferably the fourth layer of silica has a geometric thickness between 80 nm and 100 nm.

Preferably there is an anti-iridescence coating in between the low emissivity coating on the second major surface of the third sheet of glazing material and the third sheet of glazing material.

Preferably the anti-iridescence layer comprises a first layer and a second layer, wherein the first layer of the anti-iridescence layer has a higher refractive index than the second layer of the anti-iridescence layer and the second layer of the anti-iridescence layer is in between the first layer of the anti-iridescence layer and the low emissivity coating on the second major surface of the third sheet of glazing material.

Preferably the first layer of the anti-iridescence layer comprises tin oxide.

Preferably the second layer of the anti-iridescence layer comprises silica.

Preferably the first layer of the anti-iridescence layer has a geometric thickness of between 10 nm and 50 nm, preferably between 15 nm and 35 nm.

Preferably the second layer of the anti-iridescence layer has a geometric thickness of between 10 nm and 50 nm, preferably between 15 nm and 35 nm.

In some embodiments of the second aspect of the present invention, preferably there is a haze reducing layer in between the third sheet of glazing material and the anti-iridescence coating on the second major surface of the third sheet of glazing material.

Preferably the haze reducing layer comprises silica.

Preferably the thickness of the haze reducing layer is between 5 nm and 50 nm, more preferably between 5 nm and 25 nm.

In some embodiments of the second aspect of the present invention the low emissivity coating on the second major surface of the third sheet of glazing material comprises at least one layer of fluorine doped tin oxide.

Preferably the geometric thickness of the at least one layer of fluorine doped tin oxide of the low emissivity coating on the second major surface of the third sheet of glazing material is between 100 nm and 600 nm.

Preferably the geometric thickness of the at least one layer of fluorine doped tin oxide of the low emissivity coating on the second major surface of the third sheet of glazing material is between 100 nm and 300 nm, more preferably between 100 nm and 290 nm, even more preferably between 100 nm and 250 nm.

By having a thin layer of fluorine doped tin oxide the low emissivity coating is less susceptible to surface damage because the coating is less rough. In addition costs are reduced because less coating is required to achieve the anti-condensation properties. Furthermore the G value of the insulated glazing unit is higher compared to the same insulated glazing unit with a thicker layer of fluorine doped tin oxide.

Preferably the geometric thickness of the at least one layer of fluorine doped tin oxide of the low emissivity coating on the second major surface of the third sheet of glazing material is between 300 nm and 400 nm, more preferably between 300 nm and 350 nm.

Preferably the geometric thickness of the at least one layer of fluorine doped tin oxide of the low emissivity coating on the second major surface of the third sheet of glazing material is between 400 nm and 600 nm, more preferably between 500 nm and 580 nm.

In some embodiments of the second aspect of the present invention there are no other layers on the low emissivity coating on the second major surface of the third sheet of glazing material.

In some embodiments, there is a layer of silica on the low emissivity coating on the second major surface of the third sheet of glazing material. Preferably the layer of silica on the low emissivity coating on the second major surface of the third sheet of glazing material has a geometric thickness of between 5 nm and 50 nm.

In some embodiments, there is a layer of titania on the low emissivity coating on the second major surface of the third sheet of glazing material. Preferably the layer of titania on the low emissivity coating on the second major surface of the third sheet of glazing material has a geometric thickness of between 5 nm and 50 nm.

Embodiments of the first and second aspects of the present invention have other preferable features. These other preferable features may be may be used in any combination and with the first and/or second aspects of the present invention.

In the first and second aspects of the present invention, suitable glazing material is glass, in particular soda-lime-silica glass or borosilicate glass. A typical soda-lime-silica glass composition is (by weight), $SiO_2$ 69-74%; $Al_2O_3$ 0-3%; $Na_2O$ 10-16%; $K_2O$ 0-5%; $MgO$ 0-6%; $CaO$ 5-14%; $SO3$ 0-2%; $Fe_2O_3$ 0.005-2%.

Preferably the sheets of glazing material used in the first and second aspects of the present invention have a thickness between 2 mm and 10 mm, more preferably between 3 mm and 8 mm, even more preferably between 3 mm and 6 mm.

For a particular insulated glazing unit, the sheets of glazing material may have the same or different thickness.

For a particular insulated glazing unit, the sheets of glazing material may have the same or different glass composition.

An insulated glazing according to the first and second aspects of the present invention may comprise more than three sheets of glazing material.

An insulated glazing according to the first and second aspects of the present invention may comprise two or more low pressure spaces.

An insulated glazing according to the first and second aspects of the present invention may comprise two or vacuum insulated glazing panels.

A glazing unit according to the first and second aspects of the present invention may be used as a window in a building with the second major surface of the second sheet of glazing material facing the interior of the building.

Any of the coatings described herein may be deposited using known deposition techniques, such as atmospheric pressure chemical vapour deposition (APCVD) or sputtering. As is known in the art, oxide layers are typically deposited using APCVD. Silver layers may be deposited using known sputtering techniques.

In the context of the present invention U-values were determined in accordance with EN12898 and EN673.

In the context of the present invention roughness values were determined using an Atomic Force Microscope and defined in terms of parameters in accordance with ISO/DIS 25178-2 (2007).

BRIEF DESCRIPTION OF THE DRAWINGS

Embodiments of the present invention will now be described by way of example only with reference to the accompanying drawings (not to scale), in which:

FIG. 1 shows a schematic representation of part of a vacuum insulated glazing according to the first aspect of the present invention;

FIG. 2 shows a schematic representation of part of another vacuum insulated glazing according to the first aspect of the present invention;

FIG. 3 shows a schematic representation of part of an insulated glazing unit according to the first aspect of the present invention;

FIG. 4 shows a schematic representation of part of another vacuum insulated glazing according to the first aspect of the present invention;

FIG. 5 shows a schematic representation of part of an insulated glazing unit according to the second aspect of the present invention and FIG. 6 shows a schematic representation of a coated glass sheet for use in an insulated glazing according to the first or second aspects of the present invention.

DETAILED DESCRIPTION OF THE INVENTION

Figure 6:
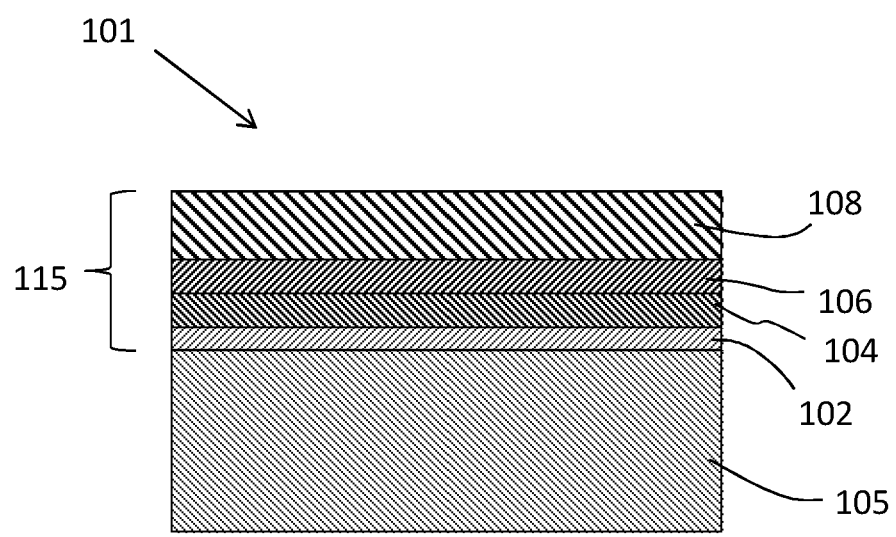

FIG. 1 shows a schematic representation of part of an insulated glazing unit according to the first aspect of the present invention. In this particular example, the insulated glazing unit is a vacuum insulated glazing unit 1 (VIG). The manufacture of such a VIG is described, for example, in EP0999330A1.

The VIG 1 has a first sheet of glass 3 and a second sheet of glass 5. The first sheet of glass 3 has a first major surface 7 and an opposing second major surface (not labelled in the figure). The second sheet of coated glass has a first major surface and an opposing second major surface (both not labelled in the figure).

Each sheet of glass 3, 5 is a soda-lime-silica composition having been made using the float process. Each glass sheet 3, 5 is 3 mm thick.

The first sheet of glass 3 is spaced apart from the second sheet of glass 5 by a plurality of stainless steel spacers 11 (only five of which are shown in FIG. 1). The spacers maintain a space 12 between the two glass sheets 3, 5. The space 12 is a low pressure space, having been evacuated during construction of the VIG 1. A peripheral seal 10 of solder glass or the like ensures the space 12 remains at low pressure i.e. the peripheral seal 10 is a hermetic seal.

On the second major surface of the first sheet of glass 3 is a low emissivity coating 13. On the second major surface of the second sheet of glass 5 is a low emissivity coating 15.

The VIG 1 is configured such that in use the first major surface 7 of the first sheet of coated glass 3 faces the exterior of the building in which the VIG 1 is installed, and the second major surface of the second sheet of coated glass 5 (and consequently the low emissivity coating 15) faces the interior of the building in which the VIG is installed.

Using conventional naming nomenclature for the surfaces of the VIG, the first major surface 7 is surface 1 of the VIG, the second opposing major surface of the first sheet of glass 3 is surface 2 of the VIG, the first major surface of the second sheet of coated glass 5 is surface 3 of the VIG and the outer surface of the low emissivity coating 15 on the second major surface of the second glass sheet 5 is surface 4 of the VIG. The outer surface of the low emissivity coating 15 is labelled with the numeral 9 on FIG. 1.

Using the notation adopted in the present application, first major surface 7 may correspond to surface i, in which case the second opposing major surface of glass sheet 3 corresponds to surface ii, the first major surface of the second sheet of coated glass 5 corresponds to surface iii (i.e. the surface of coated glass sheet 5 facing space 12) and the opposing major surface of glass sheet 5 corresponds to surface iv.

The low emissivity coating 13 comprises a single layer of sputtered silver, but may comprise a double layer or triple layer of sputtered silver. Each silver layer may have a thickness between 5 nm and 20 nm. Examples of such coatings are described in U.S. Pat. Nos. 5,344,718 and 5,557,462. Alternatively the low emissivity coating 13 comprises at least one layer of fluorine doped tin oxide that has been deposited on the glass surface using atmospheric chemical deposition. The low emissivity coating 13 may be the same as the low emissivity coating 15. The low emissivity coating 13 may consist of an undercoat layer of SiCOx having a geometric thickness of 75 nm and a low emissivity layer, on the undercoat layer, of fluorine doped tin oxide ($SnO_2$:F) having a geometric thickness of 320 nm i.e. the glass sheet 3 with low emissivity coating 13 on the second major surface having a structure glass/SiCOx(75 nm)/$SnO_2$:F(320 nm).

The low emissivity coating 15 is described in more detail with reference to FIG. 6.

In an alternative to the embodiment shown in FIG. 1, there is no low emissivity coating 13 on the second major surface of the first sheet of glass 3, for example the sheet of glass 3 may be an uncoated sheet of glass.

In another alternative to the embodiment shown in FIG. 1, the orientation of the glazing is changed such that the first major surface 7 of the first sheet of coated glass 3 faces the interior of the building in which the VIG 1 is installed, and the second major surface of the second sheet of coated glass 5 (and consequently the low emissivity coating 15) faces the exterior of the building in which the VIG is installed i.e. the low emissivity coating 15 faces the sun. When the VIG is configured this way, the low emissivity coating on the exterior facing major surface of the VIG may help reduce the formation of condensation thereon because the temperature of the sheet of glass 5 may be raised. In this alternative, the glass sheet 3 may be an uncoated sheet of glass.

In any of the alternative described above in relation to FIG. 1, there may be a low emissivity coating on the first major surface of the glass sheet 5 i.e. the surface of the glass sheet 5 facing the space 12.

FIG. 2 shows a schematic representation of part of another insulated glazing unit according to the first aspect of the present invention. The insulated glazing unit is also a vacuum insulated glazing unit 21 (VIG).

The VIG 21 has a first sheet of glass 23 and a second sheet of glass 25. The first sheet of glass 23 has a first major surface and an opposing second major surface (both not labelled in the figure). The second sheet of glass has a first major surface and an opposing second major surface (both not labelled in the figure).

Each sheet of glass 23, 25 is a soda-lime-silica composition having been made using the float process. Each glass sheet 3, 5 is 3 mm thick but may be 6 mm thick.

The first sheet of glass 23 is spaced apart from the second sheet of glass 25 by a plurality of stainless steel spacers 22 (only five of which are shown in FIG. 2, the spacers 22 being the same at the spacers 11 in FIG. 1). The spacers 22 maintain a space 32 between the two glass sheets 23, 25. The space 32 is a low pressure space, having been evacuated during construction of the VIG 21. A peripheral seal 30 of solder glass or the like ensures the space 32 remains at low pressure i.e. the peripheral seal 30 is a hermetic seal.

On the first major surface of the first sheet of glass 23 is a low emissivity coating 31. On the second major surface of the first sheet of glass 23 is a low emissivity coating 33. On the second major surface of the second sheet of glass 25 is a low emissivity coating 35.

The VIG 21 is configured such that in use the first major surface of the first sheet of coated glass 23 (and consequently the low emissivity coating 31) faces the exterior of the building in which the VIG 21 is installed, and the second major surface of the second sheet of coated glass 25 (and consequently the low emissivity coating 35) faces the interior of the building in which the VIG 21 is installed.

The low emissivity coating 33 comprises a single layer of sputtered silver, but may comprise a double layer or triple layer of sputtered silver. Each silver layer may have a thickness between 5 nm and 20 nm. Examples of such coatings are described in U.S. Pat. Nos. 5,344,718 and 5,557,462. Alternatively the low emissivity coating 33 comprises at least one layer of fluorine doped tin oxide that has been deposited on the glass surface using atmospheric chemical deposition, typically when the glass is produced by the float process. The low emissivity coating 33 may be the same as the low emissivity coating 35. The low emissivity coating 33 may consist of an undercoat layer of SiCOx having a geometric thickness of 75 nm and a low emissivity layer, on the undercoat layer, of fluorine doped tin oxide having a geometric thickness of 320 nm i.e. the glass sheet 23 with low emissivity coating 33 on the second major surface thereof having a structure glass/SiCOx(75 nm)/SnO$_2$:F(320 nm).

The low emissivity coatings 31 and 35 are described in more detail with reference to FIG. 6.

FIG. 3 shows part of an insulated glazing unit 41. The insulated glazing unit 41 comprises a sheet of 3 mm soda-lime-silica glass 43 having a low emissivity coating 45 on a major surface thereof and a VIG 1 as described with reference to FIG. 1. Such an insulated glazing unit is typically referred to as a triple glazed insulated glazing unit because there are three sheets of glazing material and two spaces between the sheets.

The VIG 1 is spaced about 12 mm apart from the coated glass sheet by a metal spacer 44 and a perimeter seal 410 of polyurethane or the like, thereby creating a space 42. The space 42 is an air space and may be filled with an inert gas such as argon or krypton.

The low emissivity coating 45 is on the major surface of the glass sheet 43 that faces the space 42.

The low emissivity coating 45 comprises a single layer of sputtered silver, but may comprise a double layer or triple layer of sputtered silver. Each silver layer may have a thickness between 5 nm and 20 nm. Examples of such coatings are described in U.S. Pat. Nos. 5,344,718 and 5,557,462. Alternatively the low emissivity coating 45 comprises at least one layer of fluorine doped tin oxide that has been deposited on the glass surface using atmospheric chemical deposition, typically when the glass is produced by the float process. The low emissivity coating 45 may be the same as the low emissivity coating 15. The low emissivity coating 45 may consist of an undercoat layer of SiCOx having a geometric thickness of 75 nm and a low emissivity layer, on the undercoat layer, of fluorine doped tin oxide having a geometric thickness of 320 nm i.e. the glass sheet 43 with low emissivity coating 45 on the second major surface thereof having a structure glass/SiCOx(75 nm)/SnO$_2$:F(320 nm).

The insulated glazing unit 41 is configured such that in use, the uncoated surface of the glass sheet 43 faces the exterior of the building. This is referred to a surface 1. The coated surface of the glass sheet 43 faces the air space 42 and is referred to as surface 2. The surface of the glass sheet 3 of VIG 1 acing the air space 42 is referred to as surface 3. The coated surface of glass sheet 3 of the VIG 1 facing the low pressure space 12 is referred to as surface 4. The uncoated surface of the glass sheet 5 of the VIG 1 facing the low pressure space 12 is referred to as surface 5 and the coated surface of the glass sheet 5 of the VIG 1 is referred to as surface 6 and faces the interior of the building.

This is conventional nomenclature for naming the surfaces of a triple glazed insulated glazing unit.

The low emissivity coatings 45, 13 and 15 on surface 2, 4 and 6 respectively reduce the U-value of the insulated glazing unit 41.

In a variant to the example shown in FIG. 3, the sheet of glass 43 may be coated on both major surfaces with a low emissivity coating i.e. surface 1 has a low emissivity coating thereon.

In this variant, the low emissivity coating on surface 1 may be the same as the low emissivity coating 45. It is preferred that the low emissivity coating on the major surface of glass sheet 43 facing the airspace comprises at least one fluorine doped tin oxide layer, and is preferably the same as low emissivity coating 15 described with reference to FIG. 6. Preferably the low emissivity coating on surface 1 is the same as coating 15 described with reference to FIGS. 1 and 6. The provision of a low emissivity coating on surface 1 helps raise the temperature of glass sheet 43 thereby helping reduce the formation of condensation thereon.

In another variant to the insulated glazing shown in FIG. 3, the positions of the sheet of glass 43 and the VIG 1 may be reversed.

FIG. 4 shows a schematic representation of another insulated glazing unit according to the first aspect of the present invention. In this particular example, the insulated glazing unit is a vacuum insulated glazing unit 51 (VIG) and is similar to the VIG 1 and VIG 21 described above.

The VIG 51 has a first sheet of glass 53 and a second sheet of glass 55. The first sheet of glass 53 has a first major surface and an opposing second major surface (both not labelled in the figure). The second sheet of coated glass has a first major surface and an opposing second major surface (both not labelled in the figure).

Each sheet of glass 53, 55 is a soda-lime-silica composition having been made using the float process. Each glass sheet 53, 55 is 3 mm thick.

The first sheet of glass 53 is spaced apart from the second sheet of glass 55 by a plurality of stainless steel spacers 52 (only five of which are shown in FIG. 4) The spacers maintain a space 62 between the two glass sheets 53, 55 of about 0.2 mm. The space 62 is a low pressure space, having been evacuated during construction of the VIG 51. A peripheral seal 60 of solder glass or the like ensures the space 62 remains at low pressure i.e. the peripheral seal 60 is a hermetic seal.

The second major surface of glass sheet 53 faces the space 62. The first major surface of the glass sheet 55 faces the space 62.

Both major surfaces of glass sheet 53 are uncoated. On the first major surface of glass sheet 55 is a low emissivity coating 63. On the second major surface of the glass sheet 55 is a low emissivity coating 65.

The VIG 51 is configured such that in use the first major surface of the first sheet of glass 53 faces the exterior of the building in which the VIG 51 is installed, and the second major surface of the second sheet of glass 55 (and consequently the low emissivity coating 65) faces the interior of the building in which the VIG 51 is installed.

The low emissivity coating 63 comprises a single layer of sputtered silver, but may comprise a double layer or triple layer of sputtered silver. Each silver layer may have a thickness between 5 nm and 20 nm. Examples of such coatings are described in U.S. Pat. Nos. 5,344,718 and 5,557,462. Alternatively the low emissivity coating 63 comprises at least one layer of fluorine doped tin oxide that has been deposited on the glass surface using atmospheric chemical deposition. The low emissivity coating 63 may be the same as the low emissivity coating 65. The low emissivity coating 63 may consist of an undercoat layer of SiCOx having a geometric thickness of 75 nm and a low emissivity layer, on the undercoat layer, of fluorine doped tin oxide having a geometric thickness of 320 nm i.e. the glass sheet 55 with low emissivity coating 63 on the first major surface thereof having a structure glass/SiCOx(75 nm)/SnO$_2$:F(320 nm).

The low emissivity coating 65 is described in more detail with reference to FIG. 6.

In an alternative to the embodiment shown in FIG. 4, the orientation of the VIG 51 may be reversed such that in use i.e. when installed in a building, the low emissivity coating 65 faces the exterior of the building and the uncoated major surface of the first glass sheet 53 not facing the space 62 faces the interior of the building in which the VIG is installed.

In another embodiment, and with reference to FIGS. 2, 3 and 4, the VIG 1 of FIG. 3 may be replaced with the VIG 21 of FIG. 2 or the VIG 51 of FIG. 4.

FIG. 5 shows a schematic representation of part of an insulated glazing unit 71 according to the second aspect of the present invention.

The insulated glazing unit 71 comprises a sheet of 3 mm thick soda-lime-silica glass 73 spaced 12 mm apart from a VIG 81 by a metal spacer 72 and a perimeter seal 74. There is an air space 76 between the glass sheet 73 and the VIG 81.

The glass sheet 73 has first and second opposing major surfaces. The second major surface of the glass sheet 73 faces the air space 76. There is a low emissivity coating 75 on the first major surface of the glass sheet 73 and a low emissivity coating 77 on the second major surface of the glass sheet 73.

The low emissivity coating 77 comprises a single layer of sputtered silver, but may comprise a double layer or triple layer of sputtered silver. Each silver layer may have a thickness between 5 nm and 20 nm. Examples of such coatings are described in U.S. Pat. Nos. 5,344,718 and 5,557,462. Alternatively the low emissivity coating 77 comprises at least one layer of fluorine doped tin oxide that has been deposited on the glass surface using atmospheric chemical deposition. The low emissivity coating 77 may be the same as the low emissivity coating 75. The low emissivity coating 77 may consist of an undercoat layer of SiCOx having a geometric thickness of 75 nm and a low emissivity layer, on the undercoat layer, of fluorine doped tin oxide having a geometric thickness of 320 nm i.e. the SiCOx layer being in contact with the glass surface, and the SnO$_2$:F layer being on the SiCOx layer.

The low emissivity coating 75 is described in more detail with reference to FIG. 6.

The VIG 81 comprises a first sheet of glass 83 and a second sheet of glass 85 spaced apart from each other by about 0.2 mm by a plurality of stainless steel spacers 82. The spacers maintain a space 92 between the two glass sheets 83, 85. The space 92 is a low pressure space, having been evacuated during construction of the VIG 81. A peripheral seal 80 of solder glass or the like ensures the space 92 remains at low pressure i.e. the peripheral seal 80 is a hermetic seal.

Glass sheet 83 has a first major surface facing the air space 76 and a second major surface facing the low pressure space 92. On the second major surface of glass sheet 83 is a low emissivity coating 93. The low emissivity coating may be the same as the low emissivity coating 77.

Glass sheet 85 has a first major surface facing the low pressure space 92 and a second opposing major surface. Both major surfaces of the glass sheet 85 are uncoated.

In use, the second major surface of the glass sheet 85 faces the interior of the building in which the insulated glazing unit 71 is installed.

In FIG. 5 the additional low emissivity coating 75 on surface 1 helps raise the temperature of glass sheet 73 to reduce the formation of condensation thereon.

FIG. 6 shows a cross-sectional representation of a coated glass sheet useful as a pane in an insulated glazing according to either the first or second aspect of the present invention.

With reference to FIG. 6, a coated pane 101 comprising a sheet of 3 mm thick clear float glass 105 was coated with a coating structure 115 using atmospheric chemical vapour deposition in the float bath region of a float furnace, for example as described in WO97/42357A1.

The composition of glass sheet 105 was a conventional clear float glass composition (soda-lime-silica glass) having an Fe$_2$O$_3$ content of 0.11% by weight, although in another embodiment the Fe$_2$O$_3$ content was between 0.001% by weight and 0.1% by weight, typically about 0.05% by weight. In another example a higher Fe$_2$O$_3$ content float glass composition was used, having an Fe$_2$O$_3$ content by weight of about 0.18%.

The hot float glass ribbon was first coated with a layer 102 of SiO$_2$ having a geometric thickness of 15 nm. This layer 102 is a haze reducing layer such that a coated glass sheet according to the present invention has less haze than a coated glass sheet without this layer. Other such coatings may be used, for example Si$_3$N$_4$.

Next a layer 104 of SnO$_2$ having a geometric thickness of 25 nm was deposited on the SiO$_2$ layer. This layer forms part of the anti-iridescence coating structure. Next a layer 106 of SiO$_2$ having a geometric thickness of 30 nm was deposited on the SnO$_2$ layer 104. The combination of the 25 nm layer of SnO$_2$ and 30 nm layer of SiO$_2$ is an anti-iridescence coating. The layer 104 is a first layer of the anti-iridescence coating and the layer 106 is a second layer of the anti-iridescence coating.

Finally a layer 108 of fluorine doped tin oxide (SnO$_2$:F) was deposited on the 30 nm thick SiO$_2$ layer. The SnO$_2$:F layer 108 had a geometric thickness of 230 nm.

The layers 102, 104, 106 and 108 form the coating structure 115. The coating structure 115 is a low emissivity coating.

The coating structure 115 corresponds to the low emissivity coating 15 in FIG. 1, the low emissivity coating 31 and/or the low emissivity coating 35 in FIG. 2, the low emissivity coating 65 in FIG. 4 and the low emissivity coating 75 in FIG. 5.

If the SnO$_2$:F layer 108 is too thick, it has more of a tendency to be damaged, for example when being handled or cleaned. Consequently it is not necessary to use any additional coating layers on the low emissivity coating 108. Other coating layers may be deposited on the low emissivity coating 108 although this increases costs and manufacturing complexity.

As the low emissivity SnO$_2$:F layer 108 becomes thinner, the durability of the coating increases but the emissivity increases, which is not desirable. For the coated substrate shown in FIG. 6, the emissivity of the coating is 0.22.

The roughness of the SnO$_2$:F layer was determined to be about 10 nm. The roughness may be measured using an Atomic Force Microscope and defined in terms of parameters in accordance with ISO/DIS 25178-2 (2007).

The same coating as described above was deposited onto a 3.92 mm thick sheet of low iron float glass (having 0.02% by weight Fe$_2$O$_3$). The visible light transmission of this coated sheet was 84.6%, calculated according to EN410 (2011)/673 (CEN).

In an alternative to the coating structure 115 shown in FIG. 6, there may be not be a layer 102 of SiO$_2$, instead the layer 104 is in contact with the surface of the glass sheet 105. In this embodiment the geometric thickness of the layer 104 of $SnO_2$ may be between 20 nm and 30 nm and the geometric thickness of the layer 106 of $SiO_2$ on the layer 104 may have a geometric thickness of between 10 nm and 30 nm. The layer 108 of fluorine doped tin oxide ($SnO_2$:F) on the $SiO_2$ layer 106 may have a geometric thickness between 300 nm and 400 nm, typically about 320 nm. Alternatively the layer 108 of fluorine doped tin oxide ($SnO_2$:F) on the $SiO_2$ layer 106 may have a geometric thickness greater than 400 nm, typically up to about 600 nm i.e. within the range 500-580 nm.

The coating structure 115 as described may be used as a low emissivity coating on one or more major surface of glazing material in accordance with the first and second aspects of the present invention.

The examples of the present invention have reduced U-values compared to the equivalent insulated glazing unit without a low emissivity coating on an exposed surface thereof. The provision of a low emissivity coating on an exterior facing surface (i.e. surface 1) of the insulated glazing unit has the advantage that anti-condensation properties can be provided to the insulated glazing unit without the need to overcoat the low emissivity coating on said surface. This reduces manufacturing costs and manufacturing complexity. By using a relatively thin low emissivity layer, the coating is relatively smooth and less susceptible to damage that may otherwise occur to a similar thicker coating being exposed to the external environment.

In summary, from a first aspect insulated glazing units comprising first and second sheets of glazing material with a low pressure space therebetween are described herein. The major surface of the second sheet of glazing material not facing the low pressure space has a low emissivity coating comprising at least one layer of fluorine doped tin oxide thereon. There is a first anti-iridescence coating between the low emissivity coating and the second sheet of glazing material. Also from a second aspect insulated glazing units comprising three (first, second and third) sheets of glazing material with a low pressure space between first and second sheets of glazing material, and a second space between the first and third sheets of glazing material are described herein. In the second aspect there is a low emissivity coating on one or both major surfaces facing the low pressure space and the third sheet of glazing material has a low emissivity coating on both opposed major surfaces thereof.

The invention claimed is:

1. An insulated glazing unit comprising a first sheet of glazing material and a second sheet of glazing material, there being a first space between the first sheet of glazing material and the second sheet of glazing material, wherein the first sheet of glazing material has a first major surface and an opposing second major surface, and the second sheet of glazing material has a first major surface and an opposing second major surface, wherein the second major surface of the first sheet of glazing material and the first major surface of the second sheet of glazing material face the first space, wherein the first space is a low pressure space having a pressure less than atmospheric pressure, there being a plurality of spacers disposed in the first space, characterised in that the first sheet of glazing material is spaced apart from the second sheet of glazing material by less than 1 mm, the second major surface of the second sheet of glazing material has a low emissivity coating thereon, the low emissivity coating comprising at least one layer of fluorine doped tin oxide and there is a first anti-iridescence coating in between the low emissivity coating and the second sheet of glazing material.

2. The insulated glazing unit according to claim 1, wherein the geometric thickness of the at least one layer of fluorine doped tin oxide is between 100 nm and 600 nm.

3. The insulated glazing unit according to claim 1, wherein the first anti-iridescence coating comprises a first layer and a second layer, wherein the first layer of the first anti-iridescence coating has a higher refractive index than the second layer of the first anti-iridescence coating and the second layer of the first anti-iridescence coating is in between the first layer of the first anti-iridescence coating and the low emissivity coating.

4. The insulated glazing unit according to claim 3, wherein the first layer of the first anti-iridescence coating comprises tin oxide.

5. The insulated glazing unit according to claim 3, wherein the second layer of the first anti-iridescence coating comprises silica.

6. The insulated glazing unit according to claim 1, further comprising a first haze reducing layer in between the second sheet of glazing material and the first anti-iridescence coating.

7. The insulated glazing unit according to claim 6, wherein the first haze reducing layer comprises silica.

8. The insulated glazing unit according to claim 1, wherein there is a low emissivity coating on the second major surface of the first sheet of glazing material and/or a low emissivity coating on the first major surface of the second sheet of glazing material.

9. The insulated glazing unit according to claim 8, wherein the low emissivity coating on the second major surface of the first sheet of glazing material and/or the low emissivity coating on the first major surface of the second sheet of glazing material comprises at least one silver layer and/or at least one fluorine doped tin oxide layer.

10. The insulated glazing unit according to claim 1, comprising a low emissivity coating on the first major surface of the first sheet of glazing material.

11. The insulated glazing unit according to claim 10, wherein there is a layer of silica or a layer of titania or an antireflection coating on the low emissivity coating on the first major surface of the first sheet of glazing material.

12. The insulated glazing unit according to claim 10, wherein there is no other layer on the low emissivity coating on the first major surface of the first sheet of glazing material.

13. The insulated glazing unit according to claim 10, wherein the low emissivity coating on the first major surface of the first sheet of glazing material has a roughness less than 20 nm.

14. The insulated glazing unit according to claim 1, wherein there is a layer of silica or a layer of titania or an antireflection coating on the low emissivity coating on the second major surface of the second sheet of glazing material.

15. The insulated glazing unit according to claim 1, wherein there are no other layers on the low emissivity coating on the second major surface of the second sheet of glazing material.

16. The insulated glazing unit according to claim 1, wherein the low emissivity coating on the second major surface of the second sheet of glazing material has a roughness less than 20 nm.

17. The insulated glazing unit according to claim 1, comprising a third sheet of glazing material facing the first sheet of the glazing material and being separated therefrom by a second space, the third sheet of glazing material having a first major surface and a second major surface, wherein the insulated glazing unit is configured such that the second major surface of the third sheet of glazing material and the first major surface of the first sheet of glazing material face the second space.

18. The insulated glazing unit according to claim 1, wherein the low emissivity coating on the second major surface of the second sheet of glazing material is on surface 4 of the insulated glazing unit.

19. An insulated glazing unit comprising a first sheet of glazing material and a second sheet of glazing material, there being a first space between the first sheet of glazing material and the second sheet of glazing material, wherein the first sheet of glazing material has a first major surface and an opposing second major surface, and the second sheet of glazing material has a first major surface and an opposing second major surface, wherein the second major surface of the first sheet of glazing material and the first major surface of the second sheet of glazing material face the first space, wherein the first space is a low pressure space having a pressure less than atmospheric pressure, there being a plurality of spacers disposed in the first space, wherein the first major surface of the second sheet of glazing material and/or the second major surface of the first sheet of glazing material has a low emissivity coating thereon, the insulated glazing unit further comprising a third sheet of glazing material facing the first sheet of the glazing material and being separated therefrom by a second space, the third sheet of glazing material having a first major surface and a second major surface, wherein the second major surface of the third sheet of glazing material and the first major surface of the first sheet of glazing material face the second space, and wherein the second major surface of the third sheet of glazing material has a low emissivity coating thereon, characterised in that the first sheet of glazing material is spaced apart from the second sheet of glazing material by less than 1 mm and the first major surface of the third sheet of glazing material has a low emissivity coating thereon.

20. The insulated glazing unit according to claim 19, wherein the low emissivity coating on the first major surface of the third sheet of glazing material comprises at least one layer of fluorine doped tin oxide.

* * * * *